US009201281B2

(12) United States Patent
Jeong et al.

(10) Patent No.: US 9,201,281 B2
(45) Date of Patent: Dec. 1, 2015

(54) LIQUID CRYSTAL DISPLAY

(71) Applicant: Samsung Display Co., Ltd., Yongin, Gyeonggi-Do (KR)

(72) Inventors: Youn Hak Jeong, Cheonan-si (KR); Gak Seok Lee, Cheonan-si (KR); Ki Chul Shin, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 321 days.

(21) Appl. No.: 13/654,325

(22) Filed: Oct. 17, 2012

(65) Prior Publication Data
US 2013/0229609 A1 Sep. 5, 2013

(30) Foreign Application Priority Data

Mar. 5, 2012 (KR) .................... 10-2012-0022390

(51) Int. Cl.
*G02F 1/1337* (2006.01)
*G02F 1/139* (2006.01)
*G02F 1/1343* (2006.01)

(52) U.S. Cl.
CPC ........ *G02F 1/1393* (2013.01); *G02F 1/133707* (2013.01); *G02F 2001/133742* (2013.01); *G02F 2001/134345* (2013.01); *G02F 2201/122* (2013.01); *G02F 2201/123* (2013.01)

(58) Field of Classification Search
CPC ............ G02F 1/133707; G02F 1/1393; G02F 2001/134345
USPC ........................................................ 349/129
See application file for complete search history.

(56) References Cited

U.S. PATENT DOCUMENTS

| | | | | |
|---|---|---|---|---|
| 7,450,200 | B2 * | 11/2008 | Park et al. | 349/114 |
| 2004/0125329 | A1 * | 7/2004 | Lee et al. | 349/187 |
| 2006/0203172 | A1 * | 9/2006 | Baek et al. | 349/146 |
| 2009/0066900 | A1 * | 3/2009 | Park et al. | 349/138 |
| 2010/0045918 | A1 * | 2/2010 | Han et al. | 349/149 |
| 2010/0085525 | A1 * | 4/2010 | Chen et al. | 349/141 |
| 2011/0019113 | A1 * | 1/2011 | Saitoh et al. | 349/33 |
| 2011/0051057 | A1 * | 3/2011 | Song et al. | 349/106 |
| 2011/0051059 | A1 * | 3/2011 | Kang et al. | 349/110 |
| 2011/0242443 | A1 * | 10/2011 | Choi et al. | 349/38 |

FOREIGN PATENT DOCUMENTS

| | | |
|---|---|---|
| JP | 2010169814 A | 8/2010 |
| KR | 1020090054300 A | 5/2009 |
| KR | 1020100025367 A | 3/2010 |

* cited by examiner

*Primary Examiner* — Paisley L Arendt
*Assistant Examiner* — Edmond Lau
(74) *Attorney, Agent, or Firm* — Innovation Counsel LLP

(57) ABSTRACT

A liquid crystal display includes a common electrode for receiving a common voltage. The liquid crystal display further includes a pixel electrode for receiving a data voltage, the pixel electrode being associated with a pixel of the liquid crystal display. The liquid crystal display further includes a switching element electrically connected to the pixel electrode for controlling transmission of the data voltage. The liquid crystal display further includes a liquid crystal layer disposed between the common electrode and the pixel electrode. The liquid crystal display further includes a plate electrode electrically connected to the switching element and including a plate that overlaps the pixel electrode, wherein the pixel electrode spans a larger area than the plate. The pixel electrode and the plate electrode are equipotential.

34 Claims, 11 Drawing Sheets

LIQUID CRYSTAL DISPLAY

CROSS-REFERENCE TO RELATED APPLICATION

This application claims priority to and the benefit of Korean Patent Application No. 10-2012-0022390 filed in the Korean Intellectual Property Office on Mar. 5, 2012, the entire contents of which are incorporated herein by reference.

BACKGROUND OF THE INVENTION (a) Field of the Invention

The present invention relates to liquid crystal display (LCD) devices.

(b) Description of the Related Art

The liquid crystal display (LCD) is one of various flat panel display devices that have been widely used in electronic devices, such as televisions, computer monitors, and mobile phones. A typical LCD may include two panels having field generating electrodes (such as a pixel electrode and a common electrode) and may include a liquid crystal layer interposed between the display panels.

The LCD generates an electric field in the liquid crystal layer by applying voltages to the field generating electrodes. The electric field may affect orientations of liquid crystal molecules in the liquid crystal layer to control transmission of incident light, such that the liquid crystal display may display a desired image.

The LCD may also include switching elements connected to respective pixel electrodes. The LCD may further include a plurality of signal lines such as gate lines and data lines for controlling the switching elements and for applying voltages to the pixel electrodes.

Among various types of LCDs, the vertical alignment (VA) mode LCD, which aligns LC molecules such that the long axes of the LC molecules are perpendicular to the panels in the absence of an electric field, may be advantageous because of its high contrast ratio and wide reference viewing angle.

Among various types of the vertical alignment (VA) mode LCDs, the super vertical alignment (SVA) mode LCD, which performs pretilt by using an alignment member such as a mesogen, has been researched. A typical SVA mode LCD typically has a minute slit pattern. The pitch of a minute slit may be reduced for improving optical characteristics such as transmittance and the response speed of liquid crystal molecules. Nevertheless, if the pitch of the minute slit is small, the influence of a vertical electric field applied to the liquid crystal layer may increase. As a result, the lateral visibility of the SVA mode LCD may be deteriorated.

The above information is only for enhancement of understanding of the background of the invention and may contain information that does not form the prior art that is already known in this country to a person of ordinary skill in the art.

SUMMARY OF THE INVENTION

An embodiment of the invention is related to a liquid crystal display that may have desirable transmittance, desirable response speed, and desirable lateral visibility.

The liquid crystal display may include a first substrate including a pixel area;
a second substrate facing the first substrate; a liquid crystal layer interposed between the first substrate and the second substrate and including liquid crystal molecules; a first electrode disposed on the first substrate and a second electrode including a minute slit pattern; an insulating layer disposed between the first electrode and the second electrode; and a third electrode disposed on the second substrate, wherein the pixel area includes a first region having a dual electrode structure where the first electrode and the second electrode overlap each other and a second region having a single electrode structure of the second electrode, and the first electrode and the second electrode are equipotential.

In one or more embodiments, the liquid crystal molecules may include a first liquid crystal molecule disposed at the first region and a second liquid crystal molecule disposed at the second region, and an inclination angle of the first liquid crystal molecule and the inclination angle of the second liquid crystal molecule are different under driving.

In one or more embodiments, the first electrode and the third electrode have a plate shape.

In one or more embodiments, the liquid crystal molecules may further include an alignment layer disposed on at least one of the second electrode and the third electrode, and at least one of the liquid crystal layer and the alignment layer includes an alignment assistance member.

In one or more embodiments, the insulating layer includes a contact hole, and the first electrode and the second electrode may be connected through the contact hole.

In one or more embodiments, the second electrode may include a cross stem including a transverse stem and a longitudinal stem crossing the transverse stem; and a plurality of minute branches extending from the cross stem.

In one or more embodiments, the second electrode may include a plurality of regions where a plurality of minute branches extend from the cross stem in different directions.

In one or more embodiments, the contact hole of the insulating layer may be disposed according to the cross stem.

In one or more embodiments, the first electrode and the second electrode may contact in the contact hole of the insulating layer.

In one or more embodiments, the liquid crystal molecules may further include a thin film transistor including a gate electrode, a source electrode, and a drain electrode disposed on the first substrate; and a passivation layer covering the thin film transistor and having the contact hole, wherein at least one of the first electrode and the second electrode contacts the drain electrode through the contact hole of the passivation layer.

In one or more embodiments, the first electrode may have a shape that is horizontally and vertically symmetrical.

In one or more embodiments, the second electrode may include a cross stem including a transverse stem and a longitudinal stem crossing the transverse stem, and a plurality of minute branches extending from the cross stem, and the edge of the first electrode forms an angle from 45° to 135° with the direction that a plurality of minute branches extend.

In one or more embodiments, the area of the first electrode may occupy 20% to 80% of the area of the second electrode.

In one or more embodiments, the plane shape of the first electrode may be a quadrangle or a polygon.

In one or more embodiments, the plane shape of the first electrode may be a rhombus.

The liquid crystal display may include a common electrode configured for receiving a common voltage. The liquid crystal display may further include a first pixel electrode configured for receiving a first data voltage. The first pixel electrode may be associated with at least one of a pixel of the liquid crystal display and a first sub-pixel of the liquid crystal display. The liquid crystal display may include a switching element electrically connected to the first pixel electrode and configured for controlling transmission of the first data voltage. The liquid crystal display may include a liquid crystal layer disposed between the common electrode and the pixel electrode. The liquid crystal display may include a first plate electrode electrically connected to the switching element and including a first plate that overlaps the first pixel electrode. The first pixel electrode may span a larger area than the first plate.

In one or more embodiments, both of a portion of the first pixel electrode and a portion of the first plate electrode may contact a drain electrode of the switching element.

In one or more embodiments, the first plate electrode may be disposed between the first pixel electrode and a drain electrode of the switching element.

In one or more embodiments, the first plate electrode may be electrically connected through the first pixel electrode to a drain electrode of the switching element.

In one or more embodiments, the liquid crystal display may further include an insulating disposed between the first pixel electrode and the first plate.

In one or more embodiments, the insulating layer may include a contact hole, and a portion of the first pixel electrode may extend through the contact hole and may contact the first plate.

In one or more embodiments, the first pixel electrode may include a first stem electrode and a branch electrode electrically connected to the first stem electrode and extending at a first angle with respect to the first stem electrode. The insulating layer may include a first contact hole portion that may extend along a portion of the first stem electrode. The portion of the first stem electrode may extend through the first contact hole portion and may contact the first plate.

In one or more embodiments, the first stem electrode may be aligned with a first imaginary line that connects two vertices of the first plate. For example, the first plate may be a rhombus-shaped plate, and the first imaginary line may be an axis of the rhombus.

In one or more embodiments, the first pixel electrode may further include a second stem electrode electrically connected to the first stem electrode and extending at a second angle with respect to the first stem electrode. The insulating layer may further include a second contact hole portion that may extend along a portion of the second stem electrode. The portion of the second stem electrode may extend through the second contact hole portion and contacts the first plate.

In one or more embodiments, the portion of the first stem electrode may be aligned with a first imaginary line that connects two vertices of the first plate. The portion of the second stem electrode may be aligned with a second imaginary line that connects another two vertices of the first plate.

In one or more embodiments, the insulating layer may include a contact hole. The first plate electrode may further include an extension that may protrude from the first plate. A portion of the first pixel electrode may extend through the contact hole and may contact the extension.

In one or more embodiments, the first pixel electrode may include a stem electrode, a plurality of branch electrodes electrically connected to the stem electrode and extending at a constant angle with respect to the stem electrode, and a protrusion extending from the stem electrode. The first plate electrode may further include an extension that protrudes from the first plate. The protrusion may contact the extension.

In one or more embodiments, the first pixel electrode may include a stem electrode and may include a plurality of branch electrodes electrically connected to the stem electrode and extending at a first angle with respect to the stem electrode. An edge of the first plate may extend at a second angle with respect to the stem electrode in a plan view of the liquid crystal display. The second angle may be in a range of from 0 degree to 45 degrees.

In one or more embodiments, the liquid crystal display may further include a second pixel electrode configured for receiving at least one of the first data voltage and a second data voltage. The second pixel electrode may be associated with at least one of the pixel of the liquid crystal display and a second sub-pixel of the liquid crystal display. The liquid crystal display may further include a second plate electrode electrically connected to the second pixel electrode and including a second plate that overlaps the second pixel electrode. The second pixel electrode may span larger than the second plate.

In one or more embodiments, the first pixel electrode may be configured for receiving the first data voltage when the liquid crystal display receives an image signal. The second pixel electrode may be configured for receiving the second data voltage when the liquid crystal display receives the image signal. A voltage level of the second data signal may be different from a voltage level of the first data signal.

In one or more embodiments, the second plate may be larger than the first plate.

In one or more embodiments, the first plate is of a first shape, and the second plate may be of a second shape that is different from the first shape.

In one or more embodiments, the first plate electrode may further include an extension electrically connected to the first plate and disposed at an intermediate region located between the first plate and the second plate in a plan view of the liquid crystal display. The extension may contact a first protrusion of the first pixel electrode.

In one or more embodiments, a second protrusion of the first pixel electrode may extend along an imaginary line that connects two vertices of the first plate. The second protrusion may contact the first plate.

In one or more embodiments, the liquid crystal display may further include a data line configured for transmitting one or more of the first data voltage and the second voltage. An edge of the first plate may extend at a first angle with respect to the data line. An edge of the second plate may extend at a second angle with respect to the data line. A difference between the first angle and the second angle may be greater than 0 degree and less than 90 degrees.

According to one or more embodiments of the present invention, the liquid crystal display may include the pixel electrode (which has minute branches) and the equipotential plate electrode separated by the insulating layer. The structure including the plate electrode may contribute to the desirable transmittance, the desirable response speed, and the desirable lateral visibility of the liquid crystal display.

DETAILED DESCRIPTION OF THE EMBODIMENTS

Figure 1:
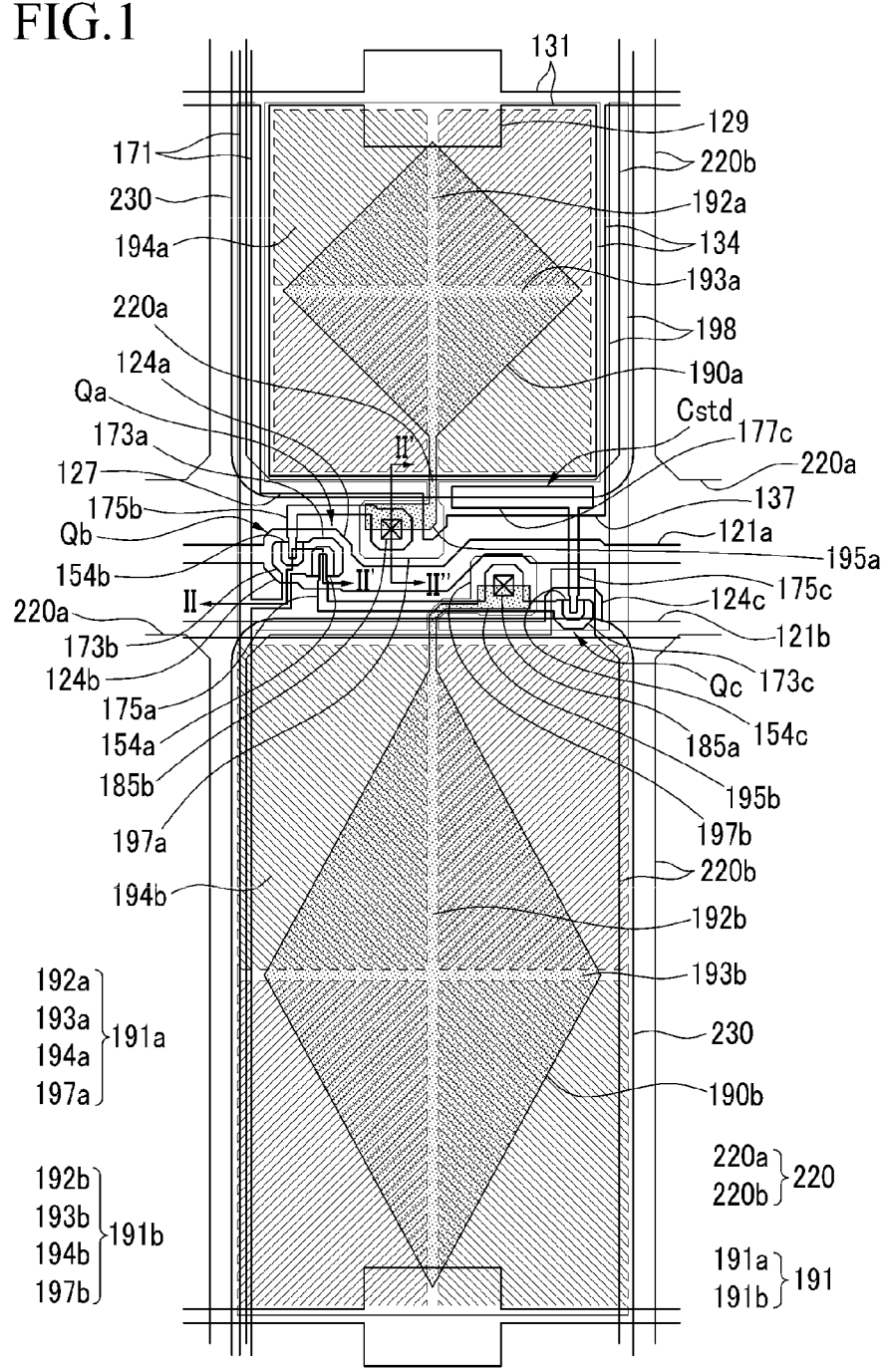
FIG. 1 illustrates a top plan view of a portion of a liquid crystal display according to one or more embodiments of the present invention.

The present invention will be described more fully hereinafter with reference to the accompanying drawings, in which embodiments of the invention are illustrated. Nevertheless, the present invention is not limited to the embodiments described herein, but may be embodied in other forms.

In the drawings, the thicknesses of layers and regions may be exaggerated for clarity. It is to be noted that when a layer is referred to as being "on" another layer or substrate, it can be directly formed on the other layer or substrate or can be formed on the other layer or substrate with a third layer interposed therebetween. Like constituent elements may be denoted by like reference numerals throughout the specification. The term "connected" may mean "electrically connected" in this application.

Figure 2:
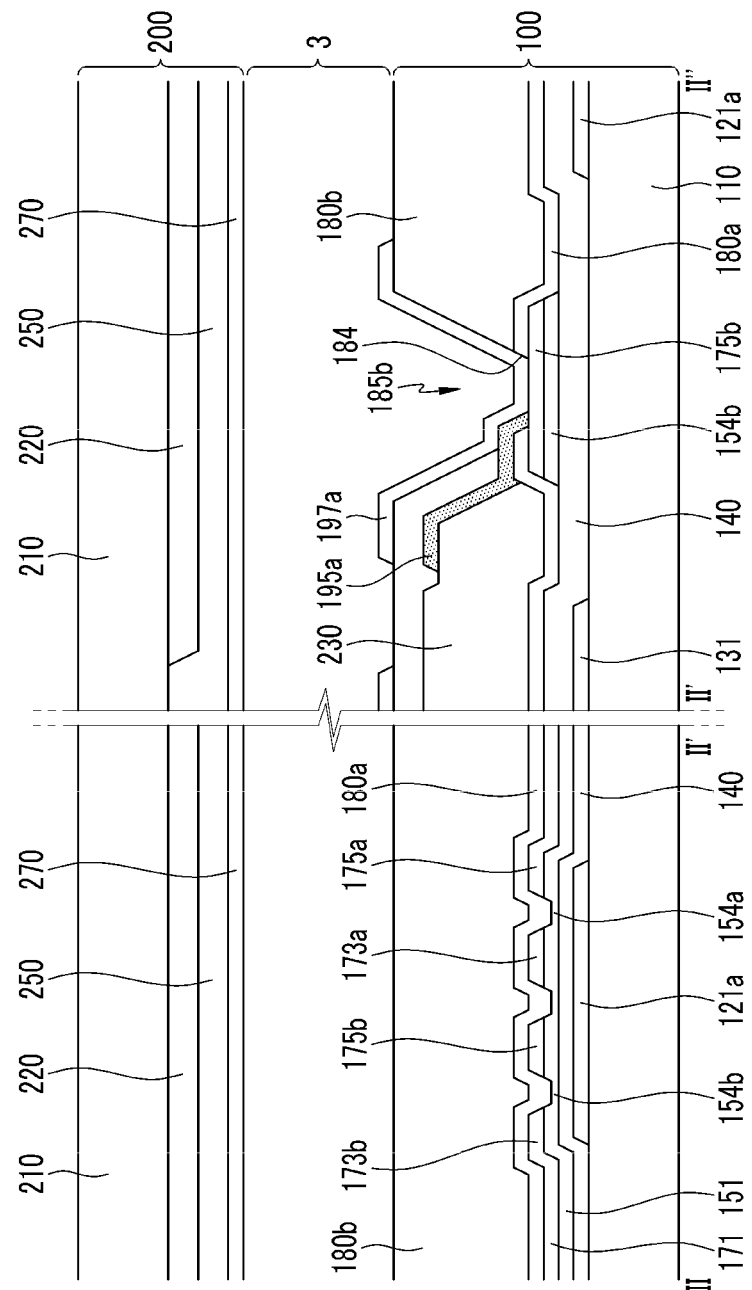
FIG. 2 illustrates a cross-sectional view taken along the line II-II' of FIG. 1.

FIG. 1 illustrates a top plan view of a portion of a liquid crystal display according to one or more embodiments of the present invention. FIG. 2 illustrates a cross-sectional view taken along the line II-II' of FIG. 1.

Referring to FIG. 1 and FIG. 2, the liquid crystal display includes a lower panel 100 and an upper panel 200 facing each other, and the liquid crystal display further includes a liquid crystal layer 3 interposed between the two panels 100 and 200.

Firstly, the lower panel 100 will be described.

A plurality of gate conductors including a plurality of gate lines (which includes a first gate line 121a and a second gate line 121b) and a plurality of storage electrode lines 131 are formed on a first substrate 110, which includes a pixel area.

The gate lines 121a and 121b extend in a mainly transverse direction for transmitting one or more gate signals. The first gate line 121a includes a first gate electrode 124a, which protrudes farther from the second gate line 121b, and a second gate electrode 124b, which protrudes toward the second gate line 121b. The second gate line 121b includes a third gate electrode 124c protruding toward the first gate line 121a. The first gate electrode 124a and the second gate electrode 124b are connected to each other to form a protrusion protruding in at least two directions.

The storage electrode lines 131 substantially extend in the transverse direction for transfer a predetermined voltage, such as a common voltage. Each storage electrode line 131 includes a storage electrode 129 having a first portion protruding farther from the first gate line 121a and having a second portion protruding toward the first gate line 121a. The storage electrode line 131 may further include a pair of longitudinal portions 134 extending substantially perpendicular to the gate lines 121a and 121b toward at least one of the gate lines 121a and 121b. The storage electrode line 131 may further include a transverse portion 127 connecting ends of the pair of longitudinal portions 134. The transverse portion 127 includes a capacitive electrode 137 extending toward at least one of the gate lines 121a and 121b.

A gate insulating layer 140 (illustrated in FIG. 2) is formed on the gate conductors 121a, 121b, and 131.

A plurality of semiconductor stripes, which may be made of amorphous silicon or crystallized silicon, may be disposed on the gate insulating layer 140. The semiconductor stripes mainly extend in the longitudinal direction. The semiconductor strips may include first and second semiconductor layers 154a and 154b overlapping and protruding toward the first and second gate electrodes 124a and 124b. The first and second semiconductor layers 154a and 154b may be electrically connected to each other. The semiconductor strips may further include a third semiconductor layer 154c disposed on the third gate electrode 124c.

A plurality of pairs of ohmic contacts (not shown) may be formed on the semiconductor layers 154a, 154b, and 154c. The ohmic contacts may be made of silicide or of a material of n+ hydrogenated amorphous silicon doped with an n-type impurity at a high concentration.

A data conductor including a plurality of data lines 171, a plurality of first drain electrodes 175a, a plurality of second drain electrodes 175b, and a plurality of third drain electrodes 175c is formed on the ohmic contacts.

The data lines 171 are configured to transmit data signals. The data lines 171 extend in a longitudinal direction and intersect the gate lines 121a and 121b. Each data line 171 includes a first source electrode 173a and a second source electrode 173b overlapping and extending toward the first gate electrode 124a and the second gate electrode 124b. The first source electrode 173a and the second source electrode 173b may be electrically connected to each other.

Each of the first drain electrode 175a, the second drain electrode 175b, and the third drain electrode 175c may include a substantially transverse end having a wide area extending substantially parallel to the gate lines and may include a substantially longitudinal end having a bar shape extending substantially perpendicular to the gate lines. The longitudinal bar ends of the first drain electrode 175a and the second drain electrode 175b are partially enclosed by the first source electrode 173a and the second source electrode 173b, respectively. The wide transverse end of the first drain electrode 175a may be electrically connected to (and/or integrated with) the third source electrode 173c, which may be curved with a "U" shape. A wide transverse end 177c of the third drain electrode 175c overlaps the capacitive electrode 137 thereby forming a step-down capacitor Cstd, and the longitudinal bar end of the third drain electrode 175c is partially enclosed by the third source electrode 173c.

The first gate electrode 124a, the first source electrode 173a, and the first drain electrode 175a form a first thin film transistor Qa along with the first semiconductor layer 154a. The second gate electrode 124b, the second source electrode 173b, and the second drain electrode 175b form a second thin film transistor Qb along with the second semiconductor layer 154b. The third gate electrode 124c, the third source electrode 173c, and the third drain electrode 175c form a third thin film transistor Qc along with the third semiconductor layer 154c.

The semiconductor stripes 151 that include the first semiconductor layer 154a, the second semiconductor layer 154b, and the third semiconductor layer 154c (except for the channel region between the source electrodes 173a, 173b, and 173c and the corresponding drain electrodes 175a, 175b, and 175c) may have substantially the same plane shape as the data conductors (including electrodes 173a, 173b, 173c, 175a, 175b, and 175c) and the underlying ohmic contacts in the top view of the liquid crystal display. This structure may be formed by 4-mask process.

The first semiconductor layer 154a includes a portion that is not covered by the first source electrode 173a and the first drain electrode 175a and is exposed between the first source electrode 173a and the first drain electrode 175a. The second semiconductor layer 154b includes a portion that is not covered by the second source electrode 173b and the second drain electrode 175b and is exposed between the second source electrode 173b and the second drain electrode 175b. The third semiconductor layer 154c includes a portion that is not covered by the third source electrode 173c and the third drain electrode 175c and is exposed between the third source electrode 173c and the third drain electrode 175c.

A passivation layer 180a made of an inorganic insulator, such as silicon nitride or silicon oxide, is formed on the data conductors 171, 173a, 173b, 173c, 175a, 175b, and 175c and A passivation layer 180a may cover the exposed portions of first, second, and third semiconductor layers 154a, 154b, and 154c.

A color filter 230 may be disposed on the passivation layer 180a. The color filter 230 is disposed at most of the region except for the position where the first thin film transistor Qa, the second thin film transistor Qb, and the third thin film transistor Qc are disposed. In one or more embodiments, the color filter 230 may extend in the longitudinal direction in the space between adjacent data lines 171. In the one or more embodiments, the color filter 230 is formed in the lower panel 100. In one or more embodiments, the color filter 230 may be formed in the upper panel 200.

Each of plate electrodes 190a and 190b may include an electrically conductive plate disposed on a corresponding color filter 230. In one or more embodiments, extensions 195a and 195b of the plate electrodes 190a and 190b extend (and protrude) from the plates of the plate electrodes 190a and 190b, respectively overlap the wide transverse ends of the first drain electrode 175a and the second drain electrode 175b, and are disposed on (and contacting) the color filter 230.

An insulating layer 180b made of an inorganic insulating material or an organic insulating material is disposed on the plate electrodes 190a and 190b. The insulating layer 180b has a first contact hole 185a and a second contact hole 185b. The first contact hole 185a and the second contact hole 185b extend to the passivation layer 180a for forming a contact hole 184 respectively exposing the wide transverse ends of the first drain electrode 175a and the second drain electrode 175b.

A pixel electrode 191 including a first sub-pixel electrode 191a and a second sub-pixel electrode 191b is formed on the insulating layer 180b. The first sub-pixel electrode 191a and the second sub-pixel electrode 191b are divided with respect to the first gate line 121a and the second gate line 121b, and are adjacent to each other in the longitudinal direction (or column direction). The switching elements Qa, Qb, and Qc may be positioned at an intermediate area between the plates of the plate electrodes 190a and 190b (and/or between the first sub-pixel electrode 191a and the second sub-pixel electrode 191b) in the top view of the liquid crystal display. The length of the second sub-pixel electrode 191b in the longitudinal direction is greater than the length of the first sub-pixel electrode 191a in the longitudinal direction. In one or more embodiments, the length of the second sub-pixel electrode 191b may be in a range of about 1 to 3 times the length of the first sub-pixel electrode 191a.

The overall shape of each of the first sub-pixel electrode 191a and the second sub-pixel electrode 191b may be a quadrangle. The first sub-pixel electrode 191a may include a cross stem including a transverse stem 193a and a longitudinal stem 192a crossing the transverse stem 193a. The second sub-pixel electrode 191b may include a cross stem including transverse stem 193b and a longitudinal stem 192b crossing the transverse stem 193b. The first sub-pixel electrode 191a and the second sub-pixel electrode 191b may respectively include a plurality of minute branches 194a and a plurality of minute branches 194b electrically connected to corresponding cross stems. The first sub-pixel electrode 191a and the second sub-pixel electrode 191b may respectively include a protrusion 197a and a protrusion 197b electrically connected to corresponding cross stems.

Each of the first sub-pixel electrode 191a and the second sub-pixel electrode 191b is divided into four sub-regions by the corresponding transverse stems 193a or 193b and the corresponding longitudinal stems 192a or 192b. The minute branches 194a and 194b obliquely extend from the transverse stems 193a and 193b and the longitudinal stem 192a and 192b. The extending direction of each of the minute branches 194a and 194b forms an angle of about 45 degrees or 135 degrees with the gate lines 121a and 121b or the transverse stems 193a and 193b. Extension directions of the minute branches 194a and 194b of two neighboring sub-regions may cross.

In one ore more embodiments, the first sub-pixel electrode 191a further includes an outer stem enclosing the minute branches 194a of the first sub-pixel electrode 191a. The second sub-pixel electrode 191b may further include transverse portions with the minute branches 194b, the transverse stem 193b, and/or the longitudinal stem 192b being disposed between the transverse portions. The second sub-pixel electrode 191b may further include right and left longitudinal portions 198 extending and disposed on the right and left sides of the first sub-pixel electrode 191a with the first sub-pixel electrode 191a being disposed between the right and left longitudinal portions 198. The right and left longitudinal portions 198 may prevent capacitive coupling between the data line 171 and the first sub-pixel electrode 191a.

The pixel electrode 191 may include one or more minute slit patterns disposed in a unit pixel area that is defined by the pixel electrode 191 and/or defined by gate lines and data lines associated with the pixel electrode 191. The longitudinal stems 192a and 192b of the pixel electrode 191 have extensions electrically connected to the first drain electrode 175a and the second drain electrode 175b through the first contact hole 185a and the second contact hole 185b, respectively.

Referring to FIG. 2, an extension 195a of the plate electrode 190a contacts the protrusion 197a of the first sub-pixel electrode 191a in the second contact hole 185b. Accordingly, when the liquid crystal display is driven according to one or more embodiments, the first sub-pixel electrode 191a and the plate electrode 190a may be equipotential. Analogously, the second sub-pixel electrode 191b and the plate electrode 190b may be equipotential.

In one or more embodiments, the pixel electrode 191 directly contacts the drain electrodes 175a and 175b. In one or more embodiments, the pixel electrode 191 may not contact the drain electrode 175a and 175b if the plate electrodes 190a and 190b directly contact or are electrically connected to the drain electrodes 175a and 175b. In one or more embodiments, the plate electrodes 190a and 190b and the pixel electrode 191 may directly contact the drain electrodes 175a and 175b, but may be electrically connected to the drain electrodes 175a and 175b through one or more conductive members.

The plates of the plate electrodes 190a and 190b may each have a rhombus shape in the unit pixel area. Each plate may be without patterning. The plate electrodes 190a and 190b have the rhombus shape such that they may only be disposed in a portion of the region of the unit pixel area and only partially overlap corresponding sub-pixel electrodes 191a and 191b. In one or more embodiments, the plates of the plate electrodes 190a and 190b are not limited to the rhombus shape and may include one or more of various shapes disposed at the part of the unit pixel area and overlapping the pixel electrode 191 to have a dual electrode structure along with the pixel electrode 191. In one or more embodiments, the shape of each plate of the plate electrodes 191a and 191b may be horizontally and vertically symmetrical.

The unit pixel area may be a region defined by the gate line 121 and the data line 171.

In one or more embodiments, the pixel area includes a first region and a second region. The first region has a double-electrode structure with the plate electrodes 190a and 190b overlapping the pixel electrode 191. The second region has a single electrode structure with the pixel electrode 191 not overlapping the plate electrodes 190a and 190b. In driving the liquid crystal display, the tilt angle of a first set of liquid crystal molecules disposed in the first region is different from the tilt angle of a second liquid crystal molecules disposed in the second region. A tilt angle represents the degrees of inclination of a liquid crystal molecule. The reason is because the electric field generated in the first region is different from the electric field generated in the second region given the different electrode structures in the two regions.

Figure 3:
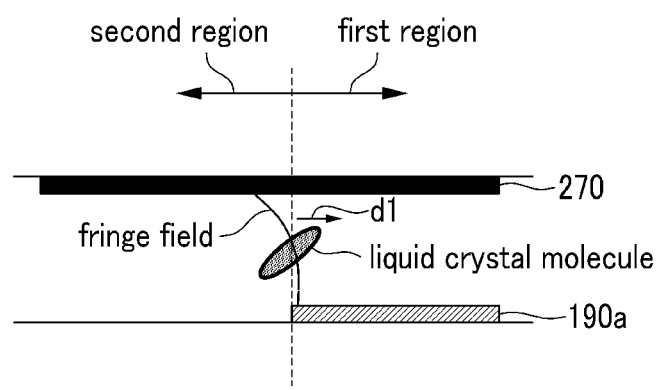
FIG. 3 illustrates an alignment of liquid crystal molecules in a boundary portion between a first region and a second region.

In one or more embodiments, the each plate of the plate electrodes 190a and 190b has a rhombus shape corresponding to the center region of the corresponding one of the sub-pixel electrode 191a and 191b. FIG. 3 illustrates an alignment of liquid crystal molecules in a boundary portion between a first region and a second region. Referring to FIG. 3, liquid crystal molecules are inclined toward first direction d1 by the fringe field. Accordingly, the liquid crystal molecules are inclined toward the center of the cross stem in the first region having the double-electrode structure. Advantageously, the liquid crystal molecules may be effectively controlled. In one or more embodiments, different voltage-transmittance patterns may be generated for the first region and the second region, thus the first region and the second region form two domains. Advantageously, the liquid crystal display may provide desirable lateral visibility.

Next, the upper panel 200 will be described. In one or more embodiments, a light blocking member 220, an overcoat 250, and a common electrode 270 are formed on a second substrate 210. In one or more embodiments, an upper alignment layer (not shown) may be formed on the common electrode 270. The common electrode 270 transmits a common voltage for a plurality of pixels.

The light blocking member 220 may overlap a region where the color filter 230 is not disposed and may overlap a portion of the color filter 230. The light blocking member 220 includes a first light blocking member 220a and a second light blocking member 220b. The first light blocking member 220a may extend substantially parallel to at least one of the first gate line 121a and the second gate line 121b and may cover the region at which the first thin film transistor Qa, the second thin film transistor Qb, and the third thin film transistor Qc are disposed. The second light blocking member 220b may extend substantially parallel to the data line 171.

The common electrode 270 may overlap the pixel area and may have a flat surface without patterning.

The liquid crystal layer 3 may have negative dielectric anisotropy. Liquid crystal molecules of the liquid crystal layer 3 are aligned such that the directors thereof stand vertical to surfaces of the two panels 100 and 200. The liquid crystal layer 3 includes an alignment assistance member including a reactive mesogen for pre-tilting the liquid crystal molecules such that the long axes of the liquid crystal molecules are parallel to the length direction of the minute branches 194a and 194b of the pixel electrode 191. In one or more embodiments, the alignment assistance member may be included in the alignment layer, not the liquid crystal layer 3.

Figure 4:
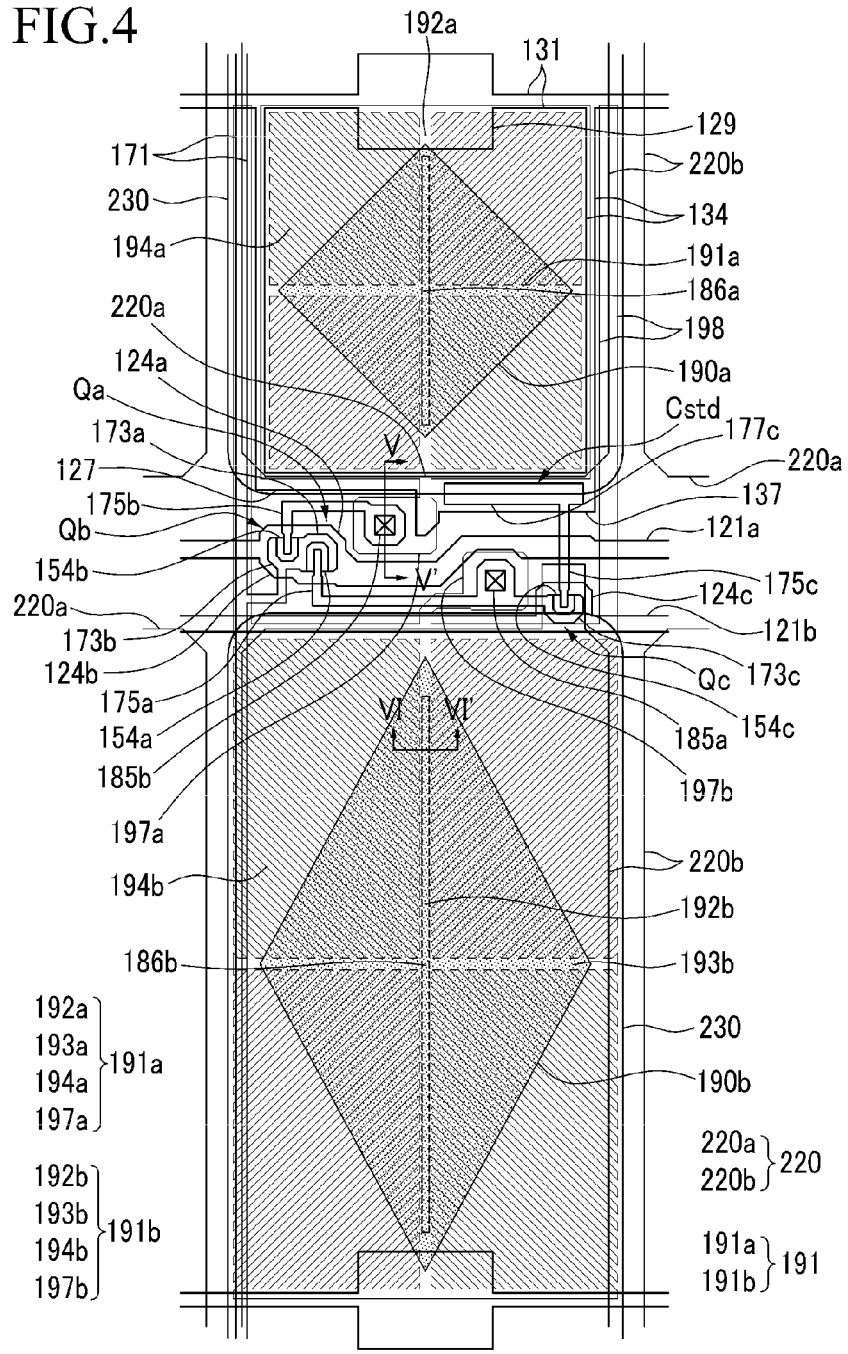
FIG. 4 illustrates a top plan view of a portion of a liquid crystal display according to one or more embodiments of the present invention.
Figure 5:
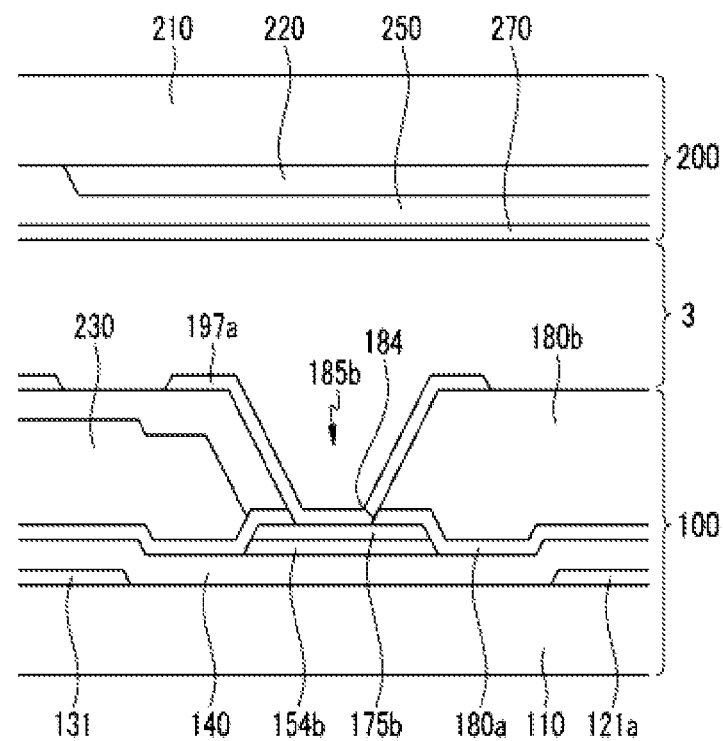
FIG. 5 illustrates a cross-sectional view taken along the line V-V' of FIG. 4.

FIG. 4 illustrates a top plan view of a portion of a liquid crystal display according to one or more embodiments of the present invention. FIG. 5 illustrates a cross-sectional view taken along the line V-V' of FIG. 4, and FIG. 6 illustrates a cross-sectional view taken along the line VI-VI' of FIG. 4.

Figure 6:
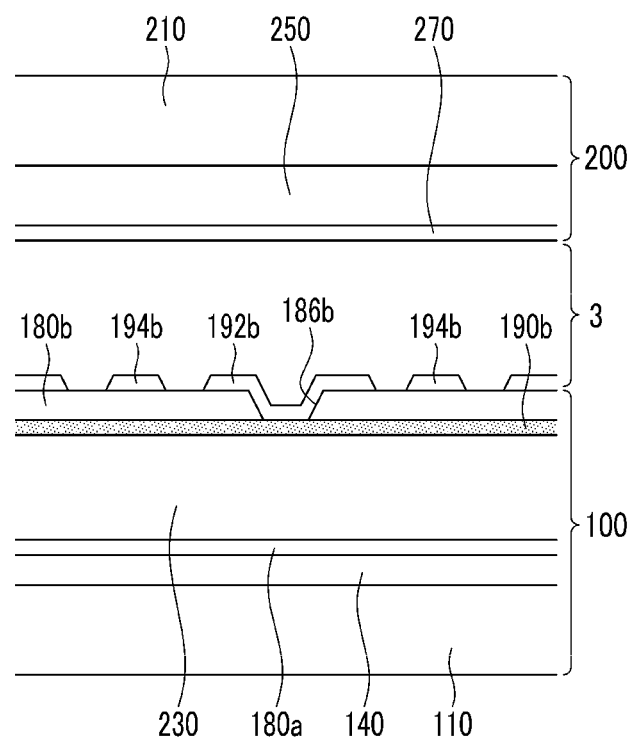
FIG. 6 is a cross-sectional view taken along the line VI-VI' of FIG. 4.

Referring to FIG. 4, FIG. 5, and FIG. 6, most of the configuration is the same as the embodiment described in FIG. 1 and FIG. 2, and at least some of the description related to FIG. 1 and FIG. 2 may be applicable to FIG. 4, FIG. 5, and FIG. 6. Nevertheless, features illustrated in FIGS. 3-4 that are different from features illustrated in FIG. 1 and FIG. 2 will be described.

Referring to FIG. 4 and FIG. 5, the protrusion 197b of the second sub-pixel electrode 191b contacts the first drain electrode 175a through the first contact hole 185a, and the protrusion 197a of the first sub-pixel electrode 191a contacts the second drain electrode 175b through the second contact hole 185b. In contrast to the examples of FIG. 1 and FIG. 2, the plate electrodes 190a and 190b illustrated in FIGS. 4-5 do not include extensions 195a and 195b. Accordingly, the plate electrodes 190a and 190b do not contact the pixel electrode 191 in the first contact hole 185a and the second contact hole 185b.

Referring to FIG. 4 and FIG. 6, the insulating layer 180b disposed on the first electrodes 190a and 190b has elongated contact holes 186a and 186b extending according to (and substantially aligned with and/or parallel to) the longitudinal stems 192a and 192b of the pixel electrode 191.

The first sub-pixel electrode 191a and the first electrode 190a contact each other through the contact hole 186a. The second sub-pixel electrode 191b and the first electrode 190b contact each other through the elongated contact hole 186b.

In one or more embodiments, the insulating layer 180b may include one or more contact holes positioned at a location where one or more of the plates of the plate electrodes 190a and 190b overlap one or more of the stems and branches of the pixel electrode 191. In one or more embodiments, the insulating layer 180b may include one or more contact holes, such as the contact holes 186a and 186b, extending and/or disposed along the longitudinal stems 192a and 192b. In one or more embodiments, the insulating layer 180b may include one or more contact holes extending and/or disposed along the transverse stems 193a and 193b. In one or more embodiments, the insulating member 180b may include one or more cross-shaped contact holes including one or more portions extending along one or more of the longitudinal stems 192a and 192b and including one or more portions extending along one or more of the transverse stems 193a and 193b. In one or more embodiments, the insulating member 180b may include one or more contact holes having one or more of various shapes that may facilitating the electrical connection between the first sub-pixel electrode 191a and the plate electrode 190a and the electrical connection between the second sub-pixel electrode 191b and the plate electrode 190b.

Given the electrical connection, when the liquid crystal display is driven according to one or more embodiments of the invention, the first sub-pixel electrode 191a and the plate electrode 190a may be equipotential, and the second sub-pixel electrode 191b and the plate electrode 190b may be equipotential. The first sub-pixel 191a and the second sub-pixel 191b may receive a same data voltage. As a result, all of the sub-pixels 191a and 191b and the plate pixels 190a and 190b may be equipotential.

In one or more embodiments, features illustrated in FIG. 4 to FIG. 6 may be combined with features illustrated in FIG. 1 and FIG. 2, such that the extension 195b of the plate electrode 190b may contact the protrusion 197b of the second sub-pixel electrode 191b in the first contact hole 185a, that the extension 195a of the plate electrode 190a may contact the protrusion 197a of the first sub-pixel electrode 191a in the second contact hole 185b, and that the plates of the plate electrodes 190a and 190b may contact the pixel electrode 191 in the contact holes 186a and 186b and/or in other contact holes located at where the plates of the plate electrodes 190a and 190b overlap portions of the pixel electrode 191. This structure increases the contact area of the plate electrodes 190a and 190b, and the pixel electrode 191. Advantageously, the required equipotential configuration may be maintained even if there are defects in some contact points.

Figure 7:
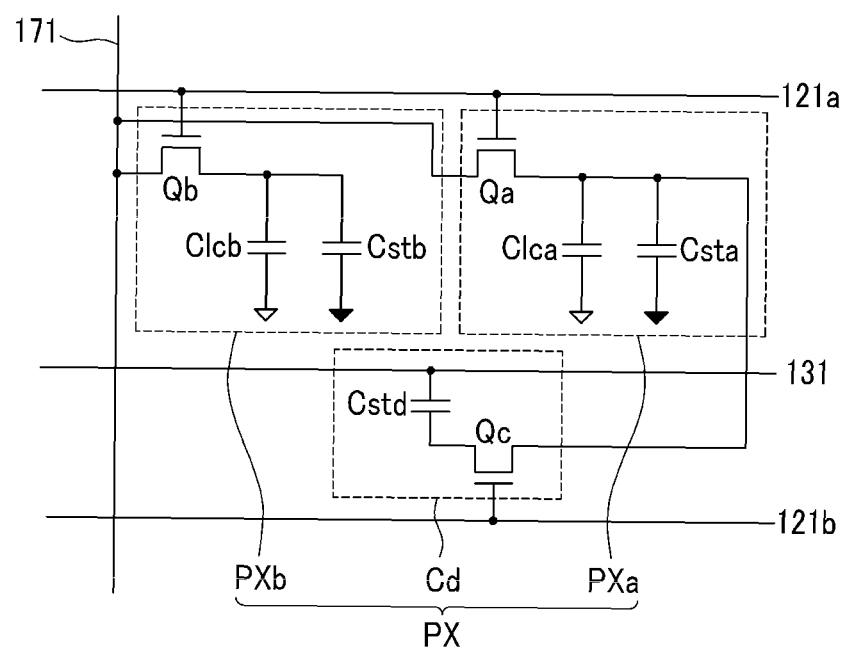
FIG. 7 illustrates an equivalent circuit diagram of one pixel of the liquid crystal display discussed with reference to FIG. 1.

FIG. 7 illustrates an equivalent circuit diagram of one pixel of the liquid crystal display discussed with reference to FIG. 1.

Referring to FIG. 7, a circuit structure and operation of the liquid crystal display discussed with reference to FIG. 1 and FIG. 4 will be described.

A liquid crystal display according to one or more embodiments of the present invention includes the first gate line 121a, the second gate line 121b, the storage electrode line 131, the data line 171, and a pixel PX connected thereto.

The pixel PX includes a first sub-pixel PXa, a second sub-pixel PXb, and a step-down portion Cd.

The first sub-pixel PXa includes the first switching element Qa, the first liquid crystal capacitor Clca, and the first storage capacitor Csta. The second sub-pixel PXb includes the second switching element Qb, the second liquid crystal capacitor Clcb, and the second storage capacitor Cstb. The step-down portion Cd includes the third switching element Qc and a step-down capacitor Cstd. The switching elements Qa, Qb, and Qc may be disposed in the lower panel 100 illustrated in FIG. 2.

Each of the first and second switching elements Qa and Qb may be a three-terminal element (such as a thin film transistor) having the control terminal connected to the first gate line 121a, the input terminal connected to the data line 171, and the output terminal connected to the liquid crystal capacitor Clca or Clcb and connected to the storage capacitor Csta or Cstb.

The third switching element Qc may be a three-terminal element (such as a thin film transistor) having the control terminal connected to the second gate line 121b, the input terminal connected to the output terminal of the first switching element Qa (and the first liquid crystal capacitor Clca and the first storage capacitor Csta), and the output terminal connected to the step-down capacitor Cstd.

The first and second liquid crystal capacitors Clca and Clcb are formed by the first and second sub-pixel electrodes 191a and 191b (connected to the first and second switching elements Qa and Qb) and the common electrode 270 (disposed in the upper panel 200) at corresponding overlapping areas. The first and second storage capacitors Csta and Cstb are formed by the storage electrode line 131 and the first and second sub-pixel electrodes 191a and 191b at corresponding overlapping areas.

The step-down capacitor Cstd is formed by the storage electrode line 131 (connected to the output terminal of the third switching element Qc and provided in the lower panel 100) and the output terminal of the third switching element Qc at an overlapping area where an insulator is interposed between the storage electrode line and the output terminal of the third switching element Qc.

The operation of the liquid crystal display discussed with reference to FIG. 1 and FIG. 4 will now be described.

When the first gate line 121a is applied with the gate-on voltage Von, the first and second thin film transistors Qa and Qb connected thereto are turned on.

Accordingly, the data voltage applied to the data line 171b is equally applied to the first and second sub-pixel electrodes 191a and 191b through the turned-on first and second switching elements Qa and Qb. The first and second liquid crystal capacitors Clca and Clcb are charged by the voltage difference between the common voltage Vcom of the common electrode 270 and the data voltage of the first and second sub-pixel electrodes 191a and 191b such that the charging voltage of the first liquid crystal capacitor Clca is the same as the charging voltage of the second liquid crystal capacitor Clcb. At the same time, the second gate line 121b is applied with the gate-off voltage Voff. In one or more embodiments of the present invention, the dual electrode structure (formed by the first and second sub-pixel electrodes 191a and 191b, the plate electrodes 190a and 190b, and the insulating layer 180b) exists in the first region. In the first region (where the dual electrode structure exists), the vertical electric field is reinforced by the influence of the plate electrodes 190a and 190b. As a result, the charge voltages in the first region may be substantially different the charge voltages in the second region (where the pixel electrode 191 does not overlap either of plate electrodes 190a and 190b), for each of the first and second sub-pixel electrodes 191a and 191b.

When the first gate line 121a is applied with the gate-off voltage Voff and simultaneously the second gate line 121b is applied with the gate-on voltage Von, the first and second switching elements Qa and Qb connected to the first gate line 121a are turned off, and the third switching element Qc is turned on. Accordingly, the charges of the first sub-pixel electrode 191a (connected to the output terminal of the first switching element Qa) flow to the step-down capacitor Cstd such that the voltage of the first liquid crystal capacitor Clca is decreased.

In one or more embodiments, the liquid crystal display is driven by frame inversion, and a data voltage of positive polarity with reference to the common voltage Vcom is applied to the data line 171 in the current frame, so the negative charges are gathered at the step-down capacitor Cstd after the previous frame is finished. If the third switching element Qc is turned on in the current frame, the positive charges of the first sub-pixel electrode 191a flow to the step-down capacitor Cstd through the third switching element Qc such that the positive charges are gathered at the step-down capacitor Cstd and that the voltage of the first liquid crystal capacitor Clca is decreased. In the next frame, in contrast, the negative charges are charged to the first sub-pixel electrode 191a, and as the third switching element Qc is turned on, the negative charges of the first sub-pixel electrode 191a flow into the step-down capacitor Cstd such that the negative charges are gathered at the step-down capacitor Cstd and that the voltage of the first liquid crystal capacitor Clca is also decreased.

As described above, according to one or more embodiments, the charging voltage of the first liquid crystal capacitor Clca is lower than the charging voltage of the second liquid crystal capacitor Clcb regardless of the polarity of the data voltage. Accordingly, the charging voltages of the first and second liquid crystal capacitors Clca and Clcb are different such that the lateral view of the liquid crystal display may be improved.

In one or more embodiments, the first switching elements Qa (associated with the first sub-pixel electrode 191a) and the second Qb (associated with the second sub-pixel electrode 191b) may be applied with different data voltages obtained from one image information signal through different data lines and/or at different times. In one or more embodiments, the first sub-pixel electrode 191a is only applied with the data voltage through the switching element Qa, and the second sub-pixel electrode 191b is capacitively connected to the first sub-pixel electrode 191a thereby receiving the relatively low voltage. In one or more embodiments, the third switching element Qc and the step-down capacitor Cstd may be omitted.

Figure 8:
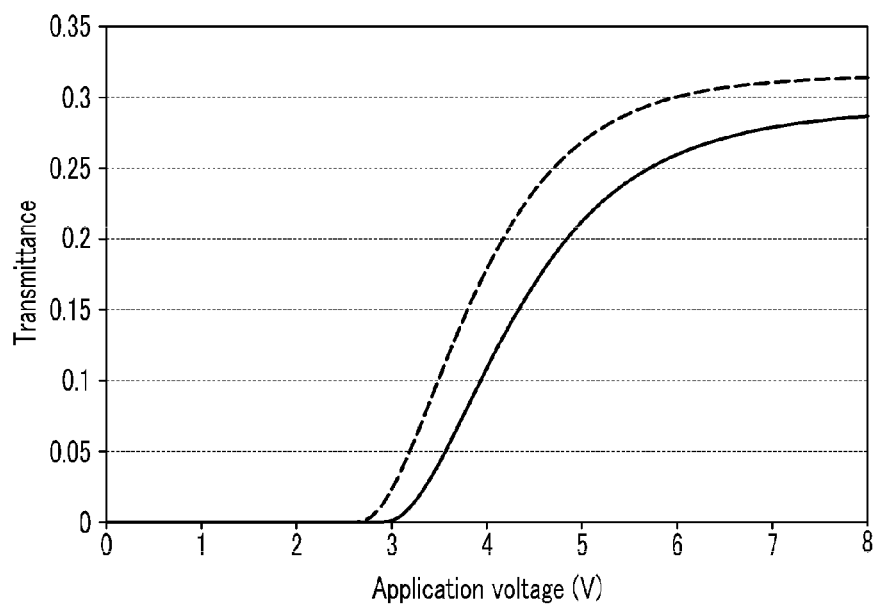
FIG. 8 illustrates a voltage-transmittance graph related to the liquid crystal display discussed with reference to of FIG. 1.
Figure 9:
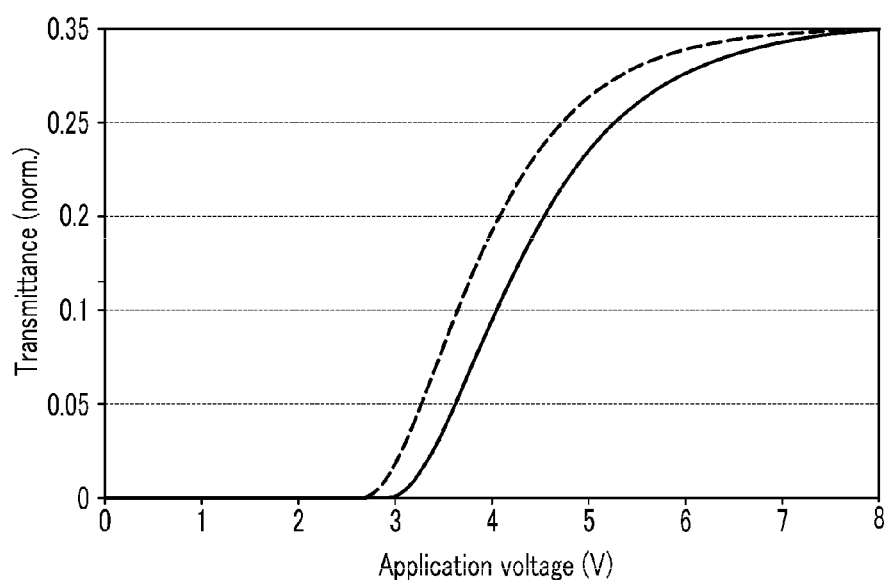
FIG. 9 illustrates a normalized graph associated with the graph of FIG. 8.

FIG. 8 illustrates a voltage-transmittance graph related to the liquid crystal display discussed with reference to FIG. 1, and FIG. 9 is a normalized graph associated with the graph of FIG. 8.

In FIG. 8 and FIG. 9 a dotted line indicates the voltage-transmittance relation in the first region having the dual electrode structure in the pixel area according to one or more embodiments of the present invention, and a solid line indicates the voltage-transmittance relation in the second region having the single electrode structure.

As illustrated in FIG. 8 and FIG. 9B, the threshold voltage Vth is shifted to the left side, and the transmittance is higher in the first region (having the dual electrode structure) than in the second region (having the single electrode structure) at various voltage levels. FIG. 9 indicates that the difference between the voltage-transmittance relations of the two different electrode structures is sufficient for improving the visibility characteristic in the first region and the second region.

Figure 10:
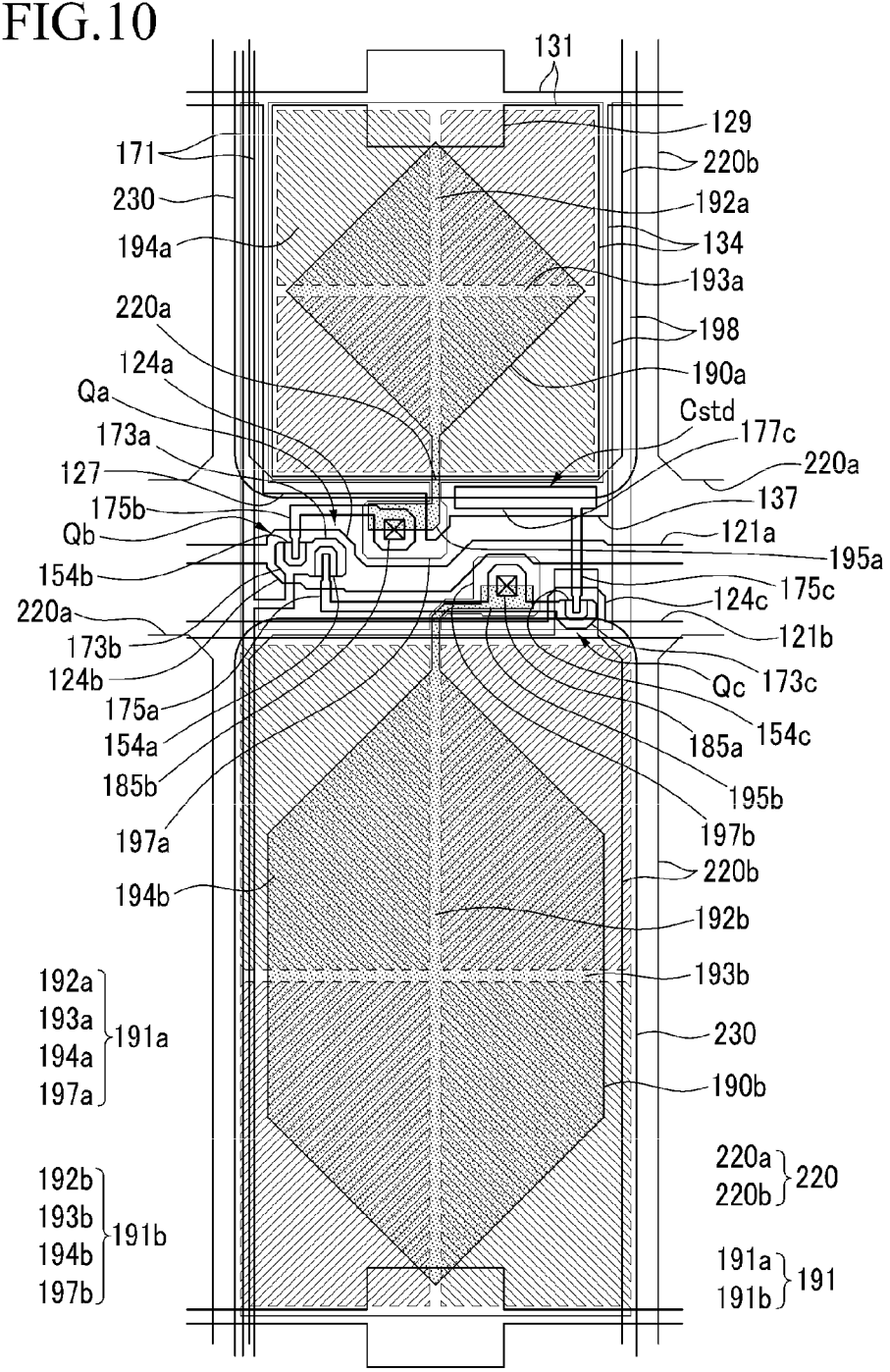
FIG. 10 and FIG. 11 illustrate top plan views of liquid crystal displays according to one or more embodiments of the present invention.

FIG. 10 and FIG. 11O illustrate top plan views of liquid crystal displays according to one or more embodiments of the present invention.

Figure 11:
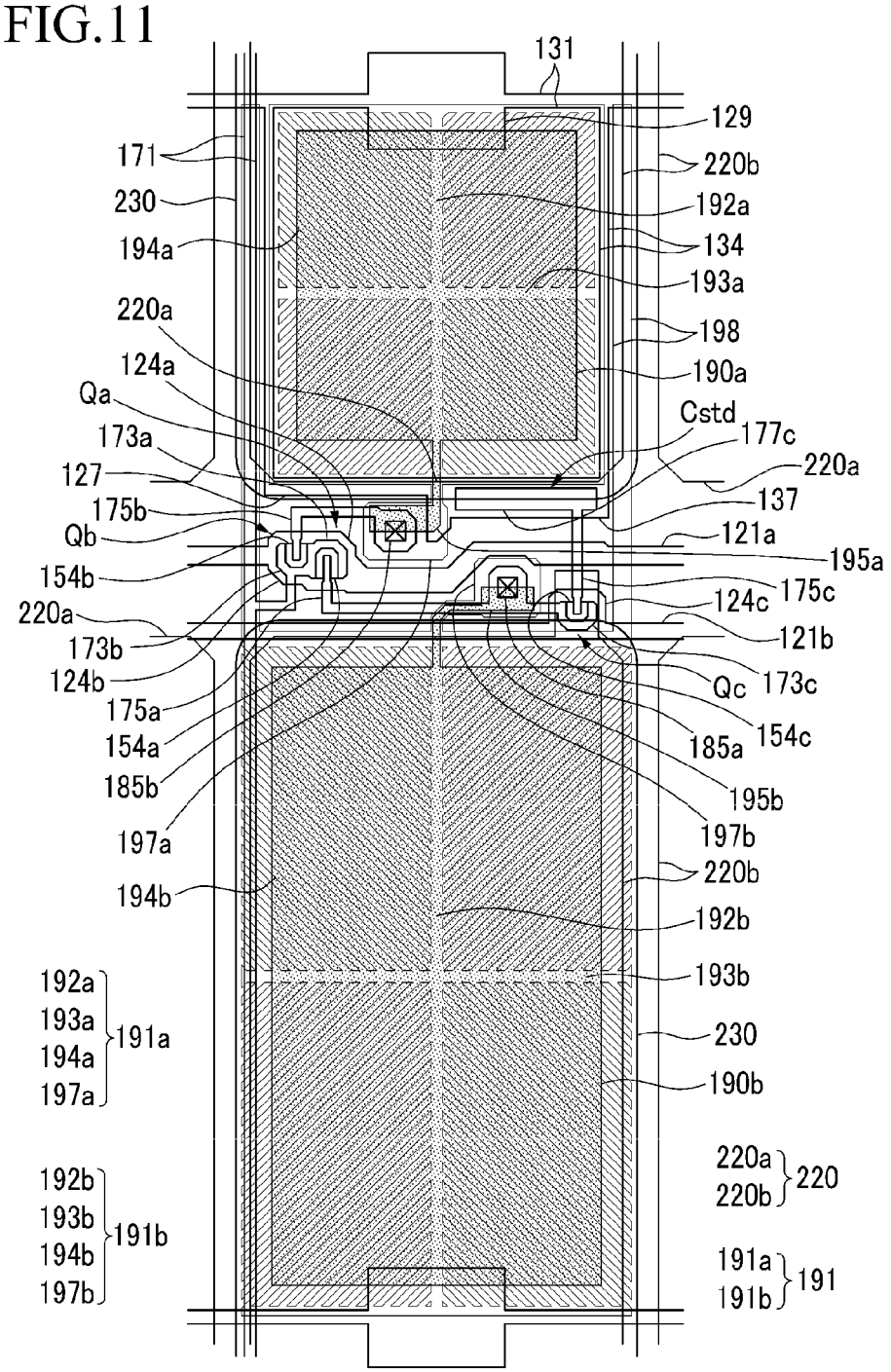

Referring to FIG. 10 and FIG. 11, most of the configurations are as analogous to the configurations discussed with reference to FIG. 1. Configurations that are substantially different from the configurations discussed with reference to FIG. 1 will be described. Some description provided with reference to FIG. 1 may be applicable to the configurations illustrated in FIG. 10 and FIG. 11.

Referring to FIG. 10 the plate electrode 190b overlapping the second sub-pixel electrode 191b has a hexagonal shape. The hexagon-shaped plate electrode 190b corresponding to the second sub-pixel electrode 191b and the rhombus-shaped plate electrode 190a corresponding to the first sub-pixel electrode 191a may cause texture of about 3%. Texture is a portion looking black in pixel.

Referring to FIG. 11, the first electrodes 190a and 190b have rectangular shapes. The rectangular shaped electrodes 190a and 190b may cause texture of about 15%.

In contrast with the configurations illustrated in FIG. 10 and FIG. 11, the rhombus-shaped plate electrodes 190a and 190b illustrated in FIG. 1 and FIG. 4 may cause texture of about 0.7%, substantially less than the 3% or 15%.

In one or more embodiments, as the shape of the first electrode 190a and 190b is deviated from the rhombus pattern, the texture is increased. In one or more embodiments, the shape of each of the first electrodes 190a and 190b may be a rhombus with axes aligned with the cross stem electrodes of the pixel electrode 191. In one or more embodiments, the long axis direction of one or more of the minute branches 194a and 194b and the edges of the rhombus may be at an angle in a range from about 45° to about 135° in a plan view of the liquid crystal display. In one or more embodiments, the extending direction of each edge of the plate of each of the plate electrodes 190a and 190b may be at an angle with the extending direction of the data line 171 in a plan view of the liquid crystal display, and the angle may be equal to or less than 45°.

While this invention has been described in connection with what is presently considered to be practical embodiments, it is to be understood that the invention is not limited to the disclosed embodiments, but is intended to cover various modifications and equivalent arrangements included within the spirit and scope of the appended claims.

<Description of Symbols>

| | |
|---|---|
| 3 liquid crystal layer | 100 lower panel |
| 110, 210 first and second substrates | 121a, 121b gate line |
| 124a, 124b gate electrode | 140 gate insulating layer |
| 154a, 154b, 154c semiconductor layer | 171 data line |
| 173a, 173b, 173c source electrode | 175a, 175b, 175c drain electrode |
| 180a passivation layer | 184,185a, 185b, 186a, 186b |
| 190a, 190b plate electrode | contact hole |
| 191 pixel electrode | 200 upper panel |
| 220a, 220b: light blocking member | 230 color filter |
| 250 overcoat | 270 common electrode |

What is claimed is:

1. A liquid crystal display comprising:
a first substrate including a pixel area;
a second substrate facing the first substrate;
a liquid crystal layer interposed between the first substrate and the second substrate and including liquid crystal molecules;
a first electrode disposed on the first substrate and a second electrode including a minute slit pattern;
an insulating layer disposed between the first electrode and the second electrode; and
a third electrode disposed on the second substrate,
wherein the pixel area includes a first region having a dual electrode structure where the first electrode and the second electrode overlap each other and a second region having a single electrode structure of the second electrode, and
wherein the first electrode and the second electrode are pixel electrodes connected to a data line through a thin film transistor, the first electrode and the second electrode being configured to receive a data voltage, and
wherein the first electrode has a plate shape.

2. The liquid crystal display of claim 1, wherein
the liquid crystal molecules includes a first liquid crystal molecule disposed at the first region and a second liquid crystal molecule disposed at the second region, and an inclination angle of the first liquid crystal molecule and the inclination angle of the second liquid crystal molecule are different under driving.

3. The liquid crystal display of claim 2, wherein
the third electrode has a plate shape.

4. The liquid crystal display of claim 1, further comprising
an alignment layer disposed on at least one of the second electrode and the third electrode, and
at least one of the liquid crystal layer and the alignment layer includes an alignment assistance member.

5. The liquid crystal display of claim 1, wherein
the insulating layer includes a contact hole, and the first electrode and the second electrode are connected through the contact hole.

6. The liquid crystal display of claim 5, wherein:
the second electrode includes a cross stem including a transverse stem and a longitudinal stem crossing the transverse stem; and a plurality of minute branches extending from the cross stem.

7. The liquid crystal display of claim 6, wherein
the second electrode includes a plurality of regions where a plurality of minute branches extend from the cross stem in different directions.

8. The liquid crystal display of claim 7, wherein
the contact hole of the insulating layer is disposed at a region corresponding to the cross stem of the second electrode.

9. The liquid crystal display of claim 5, wherein
the first electrode and the second electrode contact in the contact hole of the insulating layer.

10. The liquid crystal display of claim 1, further comprising:
a passivation layer covering the thin film transistor and having the contact hole,
wherein at least one of the first electrode and the second electrode contacts the drain electrode through the contact hole of the passivation layer.

11. The liquid crystal display of claim 1, wherein
the first electrode has a shape that is horizontally and vertically symmetrical.

12. The liquid crystal display of claim 11, wherein
the second electrode includes a cross stem including a transverse stem and a longitudinal stem crossing the transverse stem, and
a plurality of minute branches extending from the cross stem, and
the edge of the first electrode forms an angle from 45° to 135° with the direction that a plurality of minute branches extend.

13. The liquid crystal display of claim 12, wherein
the area of the first electrode occupies 20% to 80% of the area of the second electrode.

14. The liquid crystal display of claim 13, wherein
the plane shape of the first electrode is a quadrangle or a polygon.

15. The liquid crystal display of claim 14, wherein
the plane shape of the first electrode is a rhombus.

16. The liquid crystal display of claim 1, further comprising:
a storage electrode line crossing the data line.

17. A liquid crystal display comprising:
a common electrode configured for receiving a common voltage;
a first pixel electrode configured for receiving a first data voltage, the first pixel electrode being associated with at least one of a pixel of the liquid crystal display and a first sub-pixel of the liquid crystal display, the first pixel electrode including a minute slit pattern;
a switching element electrically connected to the first pixel electrode and configured for controlling transmission of the first data voltage;
a liquid crystal layer disposed between the common electrode and the first pixel electrode;
a first plate electrode electrically connected to the switching element and including a first plate that overlaps the first pixel electrode, wherein the first pixel electrode spans a larger area than the first plate electrode, and
wherein the first pixel electrode and the first plate electrode are connected to a data line through the switching element, the first pixel electrode and the first plate electrode being configured to receive a data voltage.

18. The liquid crystal display of claim 17, wherein both of a portion of the first pixel electrode and a portion of the first plate electrode contact a drain electrode of the switching element.

19. The liquid crystal display of claim 17, wherein the first plate electrode is disposed between the first pixel electrode and a drain electrode of the switching element.

20. The liquid crystal display of claim 17, wherein the first plate electrode is electrically connected through the first pixel electrode to a drain electrode of the switching element.

21. The liquid crystal display of claim 17, further comprising an insulating layer disposed between the first pixel electrode and the first plate.

22. The liquid crystal display of claim 21,
wherein the insulating layer includes a contact hole, and
wherein a portion of the first pixel electrode extends through the contact hole and contacts the first plate.

23. The liquid crystal display of claim 21,
wherein the first pixel electrode includes a first stem electrode and a branch electrode electrically connected to the first stem electrode and extending at a first angle with respect to the first stem electrode,
wherein the insulating layer includes a first contact hole portion that extends along a portion of the first stem electrode, and
wherein the portion of the first stem electrode extends through the first contact hole portion and contacts the first plate.

24. The liquid crystal display of claim 23,
wherein the first pixel electrode further includes a second stem electrode electrically connected to the first stem electrode and extending at a second angle with respect to the first stem electrode,
wherein the insulating layer further includes a second contact hole portion that extends along a portion of the second stem electrode, and
wherein the portion of the second stem electrode extends through the second contact hole portion and contacts the first plate.

25. The liquid crystal display of claim 21,
wherein the insulating layer includes a contact hole,
wherein the first plate electrode further includes an extension that protrudes from the first plate, and
wherein a portion of the first pixel electrode extends through the contact hole and contacts the extension.

26. The liquid crystal display of claim 17,
wherein the first pixel electrode includes a stem electrode, a plurality of branch electrodes electrically connected to the stem electrode and extending at a constant angle with respect to the stem electrode, and a protrusion extending from the stem electrode,
wherein the first plate electrode further includes an extension that protrudes from the first plate, and
wherein the protrusion contacts the extension.

27. The liquid crystal display of claim 17,
wherein the first pixel electrode includes a stem electrode and includes a plurality of branch electrodes electrically connected to the stem electrode and extending at a first angle with respect to the stem electrode, and
wherein an edge of the first plate extends at a second angle with respect to the stem electrode in a plan view of the liquid crystal display, the second angle is in a range of from 0 degree to 45 degrees.

28. The liquid crystal display of claim 17, further comprising:
a second pixel electrode configured for receiving at least one of the first data voltage and a second data voltage, the second pixel electrode being associated with at least one of the pixel of the liquid crystal display and a second sub-pixel of the liquid crystal display;

a second plate electrode electrically connected to the second pixel electrode and including a second plate that overlaps the second pixel electrode, wherein the second pixel electrode spans larger than the second plate.

29. The liquid crystal display of claim 28,
wherein the first pixel electrode is configured for receiving the first data voltage when the liquid crystal display receives an image signal,
wherein the second pixel electrode is configured for receiving the second data voltage when the liquid crystal display receives the image signal, and
wherein a voltage level of the second data signal is different from a voltage level of the first data signal.

30. The liquid crystal display of claim 29, wherein the second plate is larger than the first plate.

31. The liquid crystal display of claim 30,
wherein the first plate is of a first shape, and
wherein the second plate is of a second shape that is different from the first shape.

32. The liquid crystal display of claim 30,
wherein the first plate electrode further includes an extension electrically connected to the first plate and disposed at an intermediate region located between the first plate and the second plate in a plan view of the liquid crystal display, and
wherein the extension contacts a first protrusion of the first pixel electrode.

33. The liquid crystal display of claim 30, wherein the data line is configured to transmit one or more of the first data voltage and the second voltage,
wherein an edge of the first plate extends at a first angle with respect to the data line,
wherein an edge of the second plate extends at a second angle with respect to the data line, and
wherein a difference between the first angle and the second angle is greater than 0 degree and less than 90 degrees.

34. The liquid crystal display of claim 17, further comprising:
a storage electrode line crossing the data line.

* * * * *